United States Patent
Hogan et al.

(10) Patent No.: US 7,723,440 B2
(45) Date of Patent: *May 25, 2010

(54) FUNCTIONALIZED POLYMERS AND IMPROVED VULCANIZATES THEREFROM

(75) Inventors: Terrence E. Hogan, Akron, OH (US); Christine Rademacher, Akron, OH (US); William Hergenrother, Akron, OH (US); David F. Lawson, Uniontown, OH (US)

(73) Assignee: Bridgestone Corporation (JP)

( * ) Notice: Subject to any disclaimer, the term of this patent is extended or adjusted under 35 U.S.C. 154(b) by 905 days.

This patent is subject to a terminal disclaimer.

(21) Appl. No.: 10/526,132

(22) PCT Filed: Aug. 29, 2003

(86) PCT No.: PCT/US03/27081

§ 371 (c)(1), (2), (4) Date: Feb. 28, 2005

(87) PCT Pub. No.: WO2004/020475

PCT Pub. Date: Mar. 11, 2004

(65) Prior Publication Data

US 2006/0074197 A1    Apr. 6, 2006

Related U.S. Application Data

(60) Provisional application No. 60/453,693, filed on Aug. 30, 2002.

(51) Int. Cl.
C08C 19/20 (2006.01)
C08C 19/44 (2006.01)
C08F 8/34 (2006.01)

(52) U.S. Cl. ............... 525/331.9; 525/333.1; 525/333.2; 525/342; 525/348; 525/349; 525/333.9

(58) Field of Classification Search ............... 525/333.1, 525/333.2, 333.9, 342, 348, 349, 331.9
See application file for complete search history.

(56) References Cited

U.S. PATENT DOCUMENTS

| | | | |
|---|---|---|---|
| 2,515,318 A | 7/1950 | Schoene | |
| 4,052,370 A | 10/1977 | Halasa et al. | |
| 4,465,829 A | 8/1984 | Graves | |
| 4,557,306 A | 12/1985 | Graves | |
| 4,570,690 A | 2/1986 | Graves | |
| 4,675,355 A | 6/1987 | Hirata et al. | |
| 4,713,409 A | 12/1987 | Hayes et al. | |
| 4,751,271 A | 6/1988 | Graves | |
| 4,761,446 A | 8/1988 | Graves et al. | |
| 4,762,870 A | 8/1988 | Graves et al. | |
| 4,822,845 A | 4/1989 | Graves et al. | |
| 4,839,434 A | 6/1989 | Bronstert et al. | |
| 4,927,887 A | 5/1990 | Tate et al. | |
| 5,066,729 A | 11/1991 | Stayer, Jr. et al. | |
| 5,109,907 A | 5/1992 | Stayer, Jr. et al. | |
| 5,151,469 A | 9/1992 | Hergenrother et al. | |
| 5,153,159 A | 10/1992 | Antkowiak et al. | |
| 5,153,271 A | 10/1992 | Lawson et al. | |
| 5,210,144 A | 5/1993 | Lawson et al. | |
| 5,210,145 A | 5/1993 | Lawson et al. | |
| 5,217,549 A | 6/1993 | Johnson | |
| 5,227,431 A | 7/1993 | Lawson et al. | |
| 5,238,893 A | 8/1993 | Hergenrother et al. | |
| 5,244,966 A | 9/1993 | Hergenrother et al. | |
| 5,248,722 A | 9/1993 | DeTrano et al. | |
| 5,254,628 A | 10/1993 | Lawson et al. | |
| 5,268,413 A | 12/1993 | Antkowiak et al. | |
| 5,268,439 A | 12/1993 | Hergenrother et al. | |
| 5,274,106 A | 12/1993 | Lawson et al. | |
| 5,276,099 A | 1/1994 | Hergenrother et al. | |
| 5,310,798 A | 5/1994 | Lawson et al. | |
| 5,329,005 A | 7/1994 | Lawson et al. | |
| 5,332,810 A | 7/1994 | Lawson et al. | |
| 5,346,962 A | 9/1994 | Hergenrother et al. | |
| 5,349,024 A | 9/1994 | Hergenrother et al. | |
| 5,354,822 A | 10/1994 | Antkowiak et al. | |
| 5,367,014 A | 11/1994 | Morehart | |
| 5,374,364 A * | 12/1994 | Kapuscinski et al. | 508/271 |
| 5,393,721 A | 2/1995 | Kitamura et al. | |
| 5,420,219 A | 5/1995 | Lawson et al. | |
| 5,436,290 A | 7/1995 | Lawson et al. | |
| 5,463,003 A | 10/1995 | Horikawa et al. | |
| 5,463,004 A | 10/1995 | Horikawa | |
| 5,464,899 A | 11/1995 | Freeman et al. | |
| 5,491,230 A | 2/1996 | Lawson et al. | |
| 5,494,091 A | 2/1996 | Freeman et al. | |
| 5,494,958 A | 2/1996 | Freeman et al. | |
| 5,496,940 A | 3/1996 | Lawson et al. | |
| 5,500,447 A | 3/1996 | Lawson et al. | |

(Continued)

FOREIGN PATENT DOCUMENTS

EP    0 693 505 A1    1/1996

(Continued)

*Primary Examiner*—Roberto Rábago
(74) *Attorney, Agent, or Firm*—Meredith E. Hooker; Arthur Reginelli

(57) ABSTRACT

A functionalized polymer defined by the formula $\pi\text{-}R_1\text{-}\alpha$, where $\pi$ is a polymer chain, $R_1$ is a bond or a divalent organic group, and $\alpha$ is a sulfur-containing heterocycle.

9 Claims, No Drawings

U.S. PATENT DOCUMENTS

| | | | |
|---|---|---|---|
| 5,502,129 A | 3/1996 | Hergenrother et al. |
| 5,502,130 A | 3/1996 | Lawson et al. |
| 5,502,131 A | 3/1996 | Antkowiak et al. |
| 5,508,333 A | 4/1996 | Shimuzu |
| 5,508,336 A | 4/1996 | Takeichi et al. |
| 5,519,086 A | 5/1996 | Lawson et al. |
| 5,521,309 A | 5/1996 | Antkowiak et al. |
| 5,523,371 A | 6/1996 | Lawson et al. |
| 5,536,801 A | 7/1996 | Antkowiak et al. |
| 5,552,473 A | 9/1996 | Lawson et al. |
| 5,552,499 A | 9/1996 | Kitamura et al. |
| 5,567,815 A | 10/1996 | Hall et al. |
| 5,574,109 A | 11/1996 | Lawson et al. |
| 5,578,542 A | 11/1996 | Lawson et al. |
| 5,610,227 A | 3/1997 | Antkowiak et al. |
| 5,610,228 A | 3/1997 | Lawson et al. |
| 5,610,237 A | 3/1997 | Lawson et al. |
| 5,616,704 A | 4/1997 | Lawson et al. |
| 5,625,017 A | 4/1997 | Morita et al. |
| 5,643,848 A | 7/1997 | Lawson et al. |
| 5,674,798 A | 10/1997 | Kitamura et al. |
| 5,677,399 A | 10/1997 | Hall |
| 5,700,888 A | 12/1997 | Hall |
| 5,717,043 A | 2/1998 | Nakayama et al. |
| 5,723,533 A | 3/1998 | Lawson et al. |
| 5,736,617 A | 4/1998 | Kerns et al. |
| 5,785,778 A | 7/1998 | Lawson et al. |
| 5,786,441 A | 7/1998 | Lawson et al. |
| 5,792,820 A | 8/1998 | Lawson et al. |
| 5,866,650 A | 2/1999 | Lawson et al. |
| 5,883,183 A | 3/1999 | Kitamura et al. |
| 5,916,961 A | 6/1999 | Hergenrother et al. |
| 5,916,976 A | 6/1999 | Kerns et al. |
| 5,932,662 A | 8/1999 | Lawson et al. |
| 5,935,893 A | 8/1999 | Lawson et al. |
| 5,936,029 A | 8/1999 | Hall |
| 5,955,531 A | 9/1999 | Futamura |
| 5,959,048 A | 9/1999 | Lawson et al. |
| 6,008,295 A | 12/1999 | Takeichi et al. |
| 6,025,200 A | 2/2000 | Kaish et al. |
| 6,046,288 A | 4/2000 | Lawson et al. |
| 6,080,835 A | 6/2000 | Lawson et al. |
| 6,084,025 A | 7/2000 | Kitamura et al. |
| 6,136,914 A | 10/2000 | Hergenrother et al. |
| 6,228,908 B1 | 5/2001 | Takeichi et al. |
| 6,235,819 B1 | 5/2001 | Lawson et al. |
| 6,252,007 B1 | 6/2001 | Oziomek et al. |
| 6,255,401 B1 | 7/2001 | Masaki |
| 6,271,314 B1 | 8/2001 | Hergenrother et al. |
| 6,274,680 B1 | 8/2001 | Lawson et al. |
| 6,313,232 B1 | 11/2001 | Roggeman et al. |
| 6,369,167 B1 | 4/2002 | Morita et al. |
| 6,579,949 B1 | 6/2003 | Hergenrother et al. |
| 6,596,798 B1 | 7/2003 | Rademacher et al. |
| 6,838,526 B1 | 1/2005 | Sone et al. |
| 7,153,919 B2 | 12/2006 | Hogan et al. |
| 7,186,845 B2 * | 3/2007 | Fukushima et al. ......... 548/257 |
| 2002/0183461 A1 * | 12/2002 | Okuhira et al. ............. 525/535 |
| 2006/0074197 A1 | 4/2006 | Hogan et al. |
| 2006/0178467 A1 | 8/2006 | Fukushima et al. |
| 2006/0264589 A1 | 11/2006 | Yan |
| 2006/0264590 A1 | 11/2006 | Hogan et al. |

FOREIGN PATENT DOCUMENTS

| | | |
|---|---|---|
| GB | 1 258 893 | 12/1971 |

* cited by examiner

US 7,723,440 B2

FUNCTIONALIZED POLYMERS AND IMPROVED VULCANIZATES THEREFROM

This application gains benefit from U.S. Provisional Application Ser. No. 60/453,693 filed on Aug. 30, 2002.

FIELD OF THE INVENTION

This invention relates to functionalized polymers and rubber vulcanizates prepared therefrom.

BACKGROUND OF THE INVENTION

In the art of making tires, it is desirable to employ rubber vulcanizates that demonstrate reduced hysteresis loss, i.e., less loss of mechanical energy to heat. Hysteresis loss is often attributed to polymer free ends within the cross-linked rubber network, as well as the disassociation of filler agglomerates. The degree of dispersion of filler within the vulcanizate is also important, as increased dispersion provides better wear resistance.

Functionalized polymers have been employed to reduce hysteresis loss and increase bound rubber. The functional group of the functionalized polymer is believed to reduce the number of polymer free ends. Also, the interaction between the functional group and the filler particles reduces filler agglomeration, which thereby reduces hysteretic losses attributable to the disassociation of filler agglomerates (i.e., Payne effect).

Conjugated diene monomers are often anionically polymerized by using alkyllithium compounds as initiators. Selection of certain alkyllithium compounds can provide a polymer product having functionality at the head of the polymer chain. A functional group can also be attached to the tail end of an anionically-polymerized polymer by terminating a living polymer with a functionalized compound.

For example, trialkyltin chlorides, such as tributyl tin chloride, have been employed to terminate the polymerization of conjugated dienes, as well as the copolymerization of conjugated dienes and vinyl aromatic monomers, to produce polymers having a trialkyltin functionality at the tail end of the polymer. These polymers have proven to be technologically useful in the manufacture of tire treads that are characterized by improved traction, low rolling resistance, and improved wear.

Because functionalized polymers are advantageous, especially in the preparation of tire compositions, there exists a need for additional functionalized polymers. Moreover, because precipitated silica has been increasingly used as reinforcing particulate filler in tires, functionalized elastomers having affinity to silica filler are needed.

SUMMARY OF THE INVENTION

In general the present invention provides a functional polymer that is defined by the formula $$\pi\text{-}R^1\text{-}\alpha$$

where $\pi$ is a polymer chain, $R^1$ is a bond or a divalent organic group, and $\alpha$ is a sulfur-containing heterocycle.

The present invention also includes a method for preparing a functional polymer, the method comprising terminating a living polymer chain with a functionalizing agent where the functionalizing agent is defined by the formula $$Z\text{—}R^4\text{-}\alpha$$

where Z is a leaving group or an addition group, $R^4$ is a bond or a divalent organic group, and $\alpha$ is a sulfur-containing heterocycle.

The present invention further provides a vulcanizate prepared by vulcanizing a rubber formulation comprising at least one vulcanizable rubber and a filler, where the at least one vulcanizable rubber is a functional polymer that is defined by the formula $$\pi\text{-}R^1\text{-}\alpha$$

where $\pi$ is a polymer chain, $R^1$ is a bond or a divalent organic group, and $\alpha$ is a sulfur-containing heterocycle.

The functionalized polymers of this invention advantageously provide carbon black, carbon black/silica, and silica filled-rubber vulcanizates having reduced hysteresis loss, improved wear, and improved wet traction. Also, filled-rubber vulcanizates prepared with the functionalized polymers of this invention exhibit a reduced Payne effect. Excellent polymer processability is maintained. These functionalized polymers can be readily prepared by terminating living polymers.

DETAILED DESCRIPTION OF ILLUSTRATIVE EMBODIMENTS

This invention relates to functionalized polymers defined by the Formula I $$\pi\text{-}R^1\text{-}\alpha$$

where $\pi$ is a polymer chain, $R^1$ is a bond or a divalent organic group, and $\alpha$ is a sulfur-containing heterocycle.

The polymer chain ($\pi$) substituent of the functionalized polymer is preferably a rubbery polymer. More preferably, the polymer chain substituent is a polymer that has a glass transition temperature (Tg) that is less than 0° C., more preferably less than −20° C., and even more preferably less than −30° C.

Preferred polymers include anionically polymerized polymers. More specifically, preferred polymers include polybutadiene, polyisoprene, poly(styrene-co-butadiene), poly (styrene-co-butadiene-co-isoprene), poly(isoprene-co-styrene), and poly(butadiene-co-isoprene). The polymer ($\pi$) may include a functional group at the head of the polymer, which results from initiating polymerization with a functionalized initiator.

In general, the polymer should have a number average molecular weight ($M_n$) of from about 5 to about 1,000 kg/mole, preferably from about 50 to about 500 kg/mole, and more preferably 100 to about 300 kg/mole, as measured by using Gel Permeation Chromatography (GPC) calibrated with polystyrene standards and adjusted for the Mark-Houwink constants for the polymer in question.

$R^1$ is a bond or a divalent organic group. The divalent organic group is preferably a hydrocarbylene group or substituted hydrocarbylene group such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups, with each group preferably containing from 1 carbon atom, or the appropriate minimum number of carbon atoms to form the group, up to about 20 carbon atoms. In a preferred embodiment, $R^1$ contains a functional group that will react or interact with carbon black or silica.

"Substituted hydrocarbylene group" is a hydrocarbylene group in which one or more hydrogen atoms have been replaced by a substituent such as an alkyl group. $R^1$ may also contain one or more heteroatoms such as, but not limited to, nitrogen, oxygen, silicon, sulfur, and phosphorus atoms.

The sulfur-containing heterocycle α comprises a closed-ring structure in which one or more of the atoms in the ring is sulfur. Suitable sulfur-containing heterocycles may comprise more than one ring structure. In addition, suitable sulfur-containing heterocycles may comprise other heteroatoms, such as nitrogen, oxygen, silicon, and phosphorus. Suitable sulfur-containing heterocycles may comprise saturated rings, partially unsaturated rings, aromatic rings, or a combination thereof.

Examples of sulfur-containing heterocycle groups include thiirane, thietene, thiolane, thiazole, thiazoline, thiazolidine, thiadiazole, thiophene, dihydrothiophene, benzothiophene, naphthothiophene, thienothiophene, thiadiazine, dithiazine, thioxanthene, thianthrene, phenoxathiin, benzothiazole, isothiazole, dihydroisothiazole, thienofuran, thiomorpholine, thialdine, and substituted forms thereof.

Preferred sulfur-containing heterocycles comprise at least one ring having five or six members. Preferred five-member ring heterocycles include thiazoline, thiophene, and thiazolyl groups.

In one preferred embodiment, the functional polymer includes a thiazoline group, and the functionalized polymer can be defined by the formula

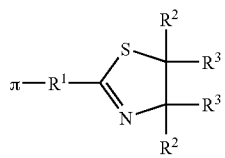

where $\pi$ and $R^1$ are as defined above, each $R^2$ is independently hydrogen or a monovalent organic group, each $R^3$ is independently hydrogen or a monovalent organic group, or where each $R^3$ combine with each other to form a divalent organic group.

The monovalent organic groups are preferably hydrocarbyl groups or substituted hydrocarbyl groups such as, but not limited to alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to 20 carbon atoms. These hydrocarbyl groups may contain heteroatoms such as, but not limited to, nitrogen, oxygen, silicon, sulfur, and phosphorus atoms. The preferred monovalent organic groups will not react with a living polymer.

In another preferred embodiment, the functional polymer includes a thienyl group, and the functional polymer can be defined by the formula

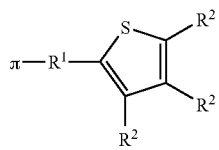

where $\pi$, $R^1$ and $R^2$ are as defined above, or where two or three $R^2$ groups combine to form a multivalent organic group. In this embodiment, $R^1$ optionally contains one or more heteroatoms such as, but not limited to, nitrogen, oxygen, silicon, sulfur, and phosphorus atoms. Preferably, $R^1$ contains nitrogen.

In yet another preferred embodiment, the functional polymer includes a benzothiazole group, and the functional polymer can be defined by the formula

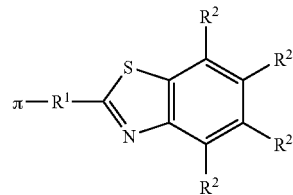

where $\pi$, $R^1$ and $R^2$ are as defined above, or where two or three $R^2$ groups combine to form a multivalent organic group. In this embodiment, $R^1$ preferably contains one or more heteroatoms such as, but not limited to, nitrogen, oxygen, silicon, sulfur, and phosphorus atoms.

An example of a functionalized polymer where $R^1$ contains a functional group that will react or interact with carbon black or silica is where $R^1$ contains a dialkoxysilyl group, and the functionalized polymer can be defined by the formula

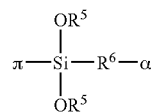

where $\pi$ and $\alpha$ are as defined above, each $R^5$ is independently a monovalent organic group, and $R^6$ is a bond or a divalent organic group.

The functionalized polymers of this invention are preferably prepared by reacting or terminating a living polymer with a functionalizing agent containing a sulfur-containing heterocycle. Preferred functionalizing agents can be defined by the formula

Z—R⁴-α where Z is a leaving group (L) or an addition group (A), $R^4$ is a bond or a divalent organic group, and α is as described above. The functionalizing agent may react with a living polymer via a substitution reaction or an addition reaction.

In one embodiment, the functionalizing agent is a substitution-type functionalizing agent that can be defined by the formula

L-R⁴-α where L is a leaving group, and $R^4$ and α are as described above. This functionalizing agent reacts with the living portion (i.e. —C⁻) of the polymer chain via a substitution reaction in which L is displaced and a bond is formed between $R^4$ and π. Where $R^4$ is a bond between L and α, L is displaced and a bond is formed between α and π. Thus, in this case, $R^4$ is equivalent to $R^1$ in Formula I above.

Leaving groups include those substituents that can be displaced by an nucleophilic compound, such as a polymer anion. Preferably the leaving group (L) will react or associate with the living polymer's counter cation (e.g., Li⁺) and form a stable or neutral compound. Exemplary leaving groups include halides, thio alkoxides, alkoxides and dialkyl amines.

In one embodiment, where α comprises a thiazoline group, the functionalizing agent is defined by the formula

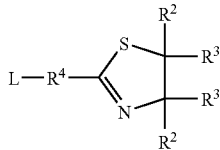

where L, $R^2$, $R^3$, and $R^4$ are as described above.

Useful functionalizing agents that comprise a thiazoline group include 2-methylthio-2-thiazoline, 2-ethylthio-2-thiazoline, 2-propylthio-2-thiazoline, 2-butylthio-2-thiazoline, 2-pentylthio-2-thiazoline, 2-hexylthio-2-thiazoline, 2-heptylthio-2-thiazoline, 2-dodecylthio-2-thiazoline, 2-phenylthio-2-thiazoline, 2-benzylthio-2-thiazoline, 2-chloro-2-thiazoline, 2-bromo-2-thiazoline, 2-iodo-2-thiazoline, 2-dimethylamino-2-thiazoline, 2-diethylamino-2-thiazoline, 2-methoxy-2-thiazoline, 2-ethoxy-2-thiazoline, 2-(N-methyl-N-3-trimethoxysilylpropyl)-thiazoline, and 2-methylthio-1-aza-3-thia-bicyclo[3-4-0]-nonene.

Another preferred functionalizing agent comprises a trialkoxysilane group and a sulfur-containing heterocycle, and can be defined by the formula

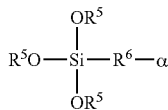

where α is as defined above, each $R^5$ is independently a monovalent organic group, and $R^6$ is a bond or a divalent organic group. In this embodiment, leaving group L is an alkoxide group ($OR^5$) and $R^4$ comprises a dialkoxysilyl group.

Preferably, $R^6$ comprises a functional group that will react or interact with carbon black and/or silica. One preferred functional group is a Schiff base, generally represented as RR'C=NR".

In one embodiment, the functionalizing agent of the present invention includes a trialkoxysilane group, a Schiff base group, and a thiophene group, and can be defined by the formula

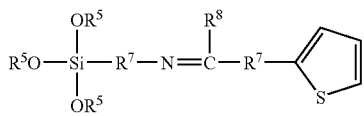

where $R^5$ is as described above, each $R^7$ is independently a bond or a divalent organic group, and $R^8$ is hydrogen or a monovalent organic group.

In another embodiment, the functionalizing agent of the present invention comprises a trialkoxysilane group and a thiazoline group, and can be represented by the formula

where $R^2$, $R^3$, $R^5$, and $R^6$ are as described above.

Useful functionalizing agents that comprise a trialkoxysilane group and a sulfur-containing heterocycle include 2-(N-methyl-N-3-trimethyoxysilylpropyl)thiazoline, 2-(N-methyl-N-3-trimethyoxysilylpropyl)thiophene, 2-(N-methyl-N-3-trimethyoxysilylpropyl)thiazole, and the reaction product of 2-thienyl carboxaldehyde and aminopropyl trialkoxysilane.

In another embodiment, the functionalizing agent is an addition-type functionalizing agent that can be defined by the formula $$A\text{-}R^4\text{-}\alpha$$

where α and $R^4$ are as described above, and A is an addition group or, in other words, a reactive moiety that will undergo an addition reaction with the living portion (i.e. —C⁻) of the polymer chain (π). This functionalizing agent reacts with a polymer chain via an addition reaction to form a functionalized polymer in which the residue of addition group A links $R^4$ to the polymer. Where $R^4$ is a bond between A and α, the residue of addition group A links α to the polymer. Thus, $R^4$ and the residue of A together comprise $R^1$ of Formula I above. In other words, $R^1$ includes the residue of an addition reaction between an addition group and a living polymer.

Preferably, A is a moiety comprising a nitrile, such as a cyano group, an alkyl or alkenyl nitrile; a Schiff base, generally represented as RR'C=NR"; or a ketone group, an aldehyde group, or an ester group. More preferably, A comprises a nitrile moiety.

In the embodiment where the functionalizing agent is an addition functionalizing agent, α preferably comprises an aromatic or partially unsaturated sulfur-containing heterocycle. More preferably, α comprises a benzothiazole, thiophene, or thiazoline moiety.

Specific examples of suitable addition functionalizing agents include 2-benzothiazoleacetonitrile, 2-cyanothiophene, 3-cyanothiophene, 2-acetothiophene, and 2-thienylcarboxaldehyde.

The method of this invention is useful for functionalizing an anionically polymerized living polymer. Anionically-polymerized living polymers are formed by reacting anionic initiators with certain unsaturated monomers to propagate a polymeric structure. Throughout formation and propagation of the polymer, the polymeric structure is anionic and "living." A new batch of monomer subsequently added to the reaction can add to the living ends of the existing chains and increase the degree of polymerization. A living polymer, therefore, is a polymeric segment having a living or reactive end. Anionic polymerization is further described in George Odian, *Principles of Polymerization*, ch. 5 ($3^{rd}$ Ed. 1991), or Panek, 94 J. Am. Chem. Soc., 8768 (1972), which are incorporated herein by reference.

Monomers that can be employed in preparing an anionically polymerized living polymer include any monomer capable of being polymerized according to anionic polymerization techniques. These monomers include those that lead to the formation of elastomeric homopolymers or copolymers. Suitable monomers include, without limitation, conjugated $C_4$-$C_{12}$ dienes, $C_8$-$C_{18}$ monovinyl aromatic monomers, and $C_6$-$C_{20}$ trienes. Examples of conjugated diene monomers include, without limitation, 1,3-butadiene, isoprene, 1,3-pentadiene, 2,3-dimethyl-1,3-butadiene, and 1,3-hexadiene. A non-limiting example of trienes includes myrcene. Aromatic vinyl monomers include, without limitation, styrene, α-methyl styrene, p-methylstyrene, and vinylnaphthalene. When preparing elastomeric copolymers, such as those containing conjugated diene monomers and aromatic vinyl monomers, the conjugated diene monomers and aromatic vinyl monomers are normally used at a ratio of 95:5 to 50:50, and preferably 95:5 to 65:35.

Any anionic initiator can be employed to initiate the formation and propagation of the living polymers. Exemplary anionic initiators include, but are not limited to, alkyl lithium initiators such as n-butyl lithium, arenyllithium initiators, arenylsodium initiators, N-lithium dihydro-carbon amides, aminoalkyllithiums, and alkyl tin lithiums. Other useful initiators include N-lithiohexamethyleneimide, N-lithiopyrrolidinide, and N-lithiododecamethyleneimide as well as organolithium compounds such as the tri-alkyl lithium adducts of substituted aldimines and substituted ketimines, and N-lithio salts of substituted secondary amines. Exemplary initiators are also described in the following U.S. Pat. Nos. 5,332,810, 5,329,005, 5,578,542, 5,393,721, 5,698,646, 5,491,230, 5,521,309, 5,496,940, 5,574,109, and 5,786,441, which are incorporated herein by reference.

For purposes of this specification, the head of the polymer will refer to that point of the polymer main chain where the initiator adds to the first monomer. The tail will therefore refer to that point of the polymer substituent main chain where the last monomer is added to the chain, which is likewise the point where the polymer is attached to the $R^1$-α group of Formula I. With this understanding, the polymer (π) may likewise include a functional group at the head of the polymer, which results from initiating polymerization with a functionalized initiator. These functional groups may include any of the various functional groups that react or interact with rubber or rubber fillers or otherwise have a desirable impact on filled rubber compositions or vulcanizates. Useful functionalized initiators include trialkyltin lithium compounds and lithiocyclic amine compounds. Exemplary tin lithio-containing initiators are disclosed in U.S. Pat. No. 5,268,439, which is incorporated herein by reference. Exemplary lithio-cyclic amino initiators are disclosed in U.S. Pat. Nos. 6,080,835, 5,786,441, 6,025,450, and 6,046,288, which are incorporated herein by reference. Other functional groups include those groups that interact with filler via through-space interaction (e.g., H-bonding, van der Waals interaction, etc.) as well as those groups that interact with or attract to each other and thereby form a domain within the rubber matrix of the polymer. Still others include selective functional groups whose affinity toward filler particles or rubber can be activated after processing, e.g., during cure. Examples of selective functional groups include those described in U.S. Pat. No. 6,579,949.

The amount of initiator employed in conducting anionic polymerizations can vary widely based upon the desired polymer characteristics. In one embodiment, it is preferred to employ from about 0.1 to about 100, and more preferably from about 0.33 to about 10 mmol of lithium per 100 g of monomer.

Anionic polymerizations are typically conducted in a polar solvent such as tetrahydrofuran (THF) or a nonpolar hydrocarbon such as the various cyclic and acyclic hexanes, heptanes, octanes, pentanes, their alkylated derivatives, and mixtures thereof, as well as benzene.

In order to promote randomization in copolymerization and to control vinyl content, a polar coordinator may be added to the polymerization ingredients. Amounts range between 0 and 90 or more equivalents per equivalent of lithium. The amount depends on the amount of vinyl desired, the level of styrene employed and the temperature of the polymerization, as well as the nature of the specific polar coordinator (modifier) employed. Suitable polymerization modifiers include, for example, ethers or amines to provide the desired microstructure and randomization of the comonomer units.

Compounds useful as polar coordinators include those having an oxygen or nitrogen heteroatom and a non-bonded pair of electrons. Examples include dialkyl ethers of mono and oligo alkylene glycols; "crown" ethers; tertiary amines such as tetramethylethylene diamine (TMEDA); linear THF oligomers; and the like. Specific examples of compounds useful as polar coordinators include tetrahydrofuran (THF), linear and cyclic oligomeric oxolanyl alkanes such as 2,2-bis (2'-tetrahydrofuryl)propane, di-piperidyl ethane, dipiperidyl methane, hexamethylphosphoramide, N—N'-dimethylpiperazine, diazabicyclooctane, dimethyl ether, diethyl ether, tributylamine and the like. The linear and cyclic oligomeric oxolanyl alkane modifiers are described in U.S. Pat. No. 4,429,091, incorporated herein by reference.

Anionically polymerized living polymers can be prepared by either batch or continuous methods. A batch polymerization is begun by charging a blend of monomer(s) and normal alkane solvent to a suitable reaction vessel, followed by the addition of the polar coordinator (if employed) and an initiator compound. The reactants are heated to a temperature of from about 20 to about 130° C. and the polymerization is allowed to proceed for from about 0.1 to about 24 hours. This reaction produces a reactive polymer having a reactive or living end. Preferably, at least about 30% of the polymer molecules contain a living end. More preferably, at least about 50% of the polymer molecules contain a living end. Even more preferably, at least about 80% contain a living end.

A continuous polymerization is begun by charging monomer(s), initiator and solvent at the same time to a suitable reaction vessel. Thereafter, a continuous procedure is followed that removes product after a suitable residence time and replenishes the reactants.

The functionalizing agent is reacted with the living polymer end. This reaction can be achieved by simply mixing the functionalizing agent with the living polymer. In a preferred embodiment, the functionalizing agent is added once a peak polymerization temperature, which is indicative of nearly complete monomer conversion, is observed. Because live ends may self-terminate, it is especially preferred to add the functionalizing agent within about 25 to 35 minutes of the peak polymerization temperature.

The amount of functionalizing agent employed to prepare the functionalized polymers is best described with respect to the equivalents of lithium or metal cation within the initiator. Accordingly, where a lithium initiator is employed, the ratio of equivalents of functionalizing agent to equivalents of lithium is preferably about 0.75:1, more preferably about 0.85:1, even more preferably about 0.95:1, and most preferably at least about 1:1.

In certain embodiments of this invention, the functionalizing agent can be employed in combination with other coupling or terminating agents. The combination of functionalizing agent with other terminating agent or coupling agent can be in any molar ratio. The coupling agents that can be employed in combination with the functionalizing agent include any of those coupling agents known in the art including, but not limited to, tin tetrachloride, tetraethyl ortho silicate, and tetraethoxy tin, and silicon tetrachloride. Likewise, any terminating agent can be employed in combination with the functionalizing agent including, but not limited to, tributyltin chloride.

After formation of the functional polymer, a processing aid and other optional additives such as oil can be added to the polymer cement. The functional polymer and other optional ingredients are then isolated from the solvent and preferably dried. Conventional procedures for desolventization and drying may be employed. In one embodiment, the functional polymer may be isolated from the solvent by steam desolventization or hot water coagulation of the solvent followed by filtration. Residual solvent may be removed by using conventional drying techniques such as oven drying or drum drying. Alternatively, the cement may be directly drum dried.

The functionalized polymers of this invention are particularly useful in preparing tire components. These tire components can be prepared by using the functionalized polymers of this invention alone or together with other rubbery polymers. Other rubbery elastomers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers.

Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

The rubber compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof.

A multitude of rubber curing agents may be employed, including sulfur or peroxide-based curing systems. Curing agents are described in 20 *Kirk-Othmer, Encyclopedia of Chemical Technology*, 365-468, (3$^{rd}$ Ed. 1982), particularly *Vulcanization Agents and Auxiliary Materials*, 390-402, and A. Y. Coran, *Vulcanization in Encyclopedia of Polymer Science and Engineering*, (2$^{nd}$ Ed. 1989), which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

These stocks are useful for forming tire components such as treads, subtreads, black sidewalls, body ply skins, bead filler, and the like. Preferably, the functional polymers are employed in tread formulations, and these tread formulations will include from about 10 to about 100% by weight of the functional polymer based on the total rubber within the formulation. More preferably, the tread formulation will include from about 35 to about 90% by weight, and more preferably from about 50 to 80% by weight of the functional polymer based on the total weight of the rubber within the formulation. The preparation of vulcanizable compositions and the construction and curing of the tire is not affected by the practice of this invention.

Preferably, the vulcanizable rubber composition is prepared by forming an initial masterbatch that includes the rubber component and filler. This initial masterbatch is mixed at a starting temperature of from about 25° C. to about 125° C. with a discharge temperature of about 135° C. to about 180° C. To prevent premature vulcanization (also known as scorch), this initial masterbatch generally excludes any vulcanizing agents. Once the initial masterbatch is processed, the vulcanizing agents are introduced and blended into the initial masterbatch at low temperatures in a final mix stage, which does not initiate the vulcanization process. Optionally, additional mixing stages, sometimes called remills, can be employed between the masterbatch mix stage and the final mix stage. Rubber compounding techniques and the additives employed therein are generally known as disclosed in Stephens, *The Compounding and Vulcanization of Rubber*, in *Rubber Technology* (2$^{nd}$ Ed. 1973). The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it is heated to about 140 to about 180° C. Cured or crosslinked rubber compositions may be referred to as vulcanizates, which generally contain three-dimensional polymeric networks that are thermoset. The other ingredients, such as processing aides and fillers, are generally evenly dispersed throughout the vulcanized network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Example 1

Control Polymer

To a 18.9 L reactor equipped with turbine agitator blades was added 4.91 kg hexane, 1.25 kg (32.8 wt %) styrene in hexane, and 7.37 kg (22.2 wt %) butadiene in hexane. To the reactor was charged 11.60 mL of 1.6 M butyllithium in hexane and 3.83 mL of 1.6 M 2,2'-di(tetrahydrofuryl)propane in hexane and the batch temperature was controlled at 49° C. After approximately 1 hour, the batch was cooled to 32° C. and a measured amount of live poly(styrene-co-butadiene) cement was then transferred to a sealed nitrogen purged 800 mL bottle. The bottle contents were then terminated with isopropanol, coagulated and drum dried.

Example 2

2-Methyl-2-thiazoline Functionalized Polymer

A second bottle of cement was transferred from the 18.9 L reactor used in Example 1 and to this was added 1 equivalent of 2-methylthio-2-thiazoline per butyllithium. The bottle contents were then coagulated and drum dried. The polymers of Examples 1 and 2 were characterized as set forth in Table I.

TABLE I

|  | Example No. | |
| --- | --- | --- |
|  | 1 | 2 |
| $M_n$ (kg/mol) | 120 | 130 |
| $M_w$ (kg/mol) | 127 | 154 |
| $T_g$ (° C.) | −31.6 | −31.6 |
| Styrene (%) | 21.0 | 21.0 |
| Block Styrene (%) | 1.9 | 1.9 |
| 1,2-butadiene (% of butadiene) | 56.8 | 56.8 |

Examples 3 and 4

Carbon Black Rubber Formulations

The rubber of Examples 1 and 2 were employed in tire formulations. The formulations are presented in Table II. More specifically, the rubber of Example 1 was incorporated in the formulation of Example 3. The rubber of Example 2 was incorporated in the formulation of Example 4.

TABLE II

|  | Example No. | |
| --- | --- | --- |
|  | 3 | 4 |
| Initial Formulation | | |
| Example 1 (weight parts) | 100 | 0 |
| Example 2 (weights parts) | 0 | 100 |
| Carbon Black | 55 | 55 |
| Wax | 1 | 1 |
| Antioxidant | 0.95 | 0.95 |
| Zinc Oxide | 2.5 | 2.5 |
| Stearic Acid | 2 | 2 |
| Aromatic Oil | 10 | 10 |
| Total | 171.45 | 171.45 |
| Final Formulation | | |
| Initial | 171.45 | 171.45 |
| Sulfur | 1.3 | 1.3 |
| Accelerators | 1.9 | 1.9 |
| Total | 174.65 | 174.65 |

Each rubber compound was prepared in two portions named Initial and Final. In the initial part, the polymer from Example 1 or 2 was mixed with carbon black, an antioxidant, stearic acid, wax, aromatic oil, and zinc oxide, in a 65 g Banbury mixer operating at 60 rpm and 133° C. Specifically, the polymer was first placed in the mixer, and after 0.5 minutes, the remaining ingredients except the stearic acid were added. The stearic acid was then added after 3 minutes. The initials were mixed for 5-6 minutes. At the end of the mixing the temperature was approximately 165° C. The sample was transferred to a mill operating at a temperature of 60° C., where it was sheeted and subsequently cooled to room temperature.

The finals were mixed by adding the initials and the curative materials to the mixer simultaneously. The initial mixer temperature was 65° C. and it was operating at 60 rpm. The final material was removed from the mixer after 2.25 minutes when the material temperature was between 100 and 105° C.

TABLE III

|  | Example No. | |
| --- | --- | --- |
|  | 3 | 4 |
| $ML_{1+4}$ @ 130° C. | 29.1 | 44.4 |
| $t_5$ (min) | 22.1 | 18.3 |
| 200% Modulus @ 23° C. (MPa) | 7.28 | 8.18 |
| Tensile @ Break @ 23° C. (MPa) | 15.81 | 16.09 |
| Elongation @ Break @ 23° C. (%) | 380 | 327 |
| tan δ @ 5% E (50° C., 1 Hz) | 0.258 | 0.135 |
| ΔG' (50° C.) (MPa)* | 4.06 | 0.97 |
| tan δ @ 0.5% E (0° C., 5 Hz) | 0.242 | 0.392 |
| Shore A Peak (23° C.) | 72.2 | 68.7 |

*ΔG' = G' (@0.25% E) − G' (@14.5% E)

Test specimens of each rubber formulation were prepared by cutting out the required mass from an uncured sheet (about 2.5 mm to 3.81 mm thick), and cured within closed cavity molds under pressure for 15 minutes at 171° C. The test specimens were then subjected to various physical tests, and the results of these tests are reported in Table III. Modulus at 200%, elongation at break, and tensile strength were measured according to ASTM D 412 (1998) Method B, where samples were died from a cured sheet about 1.8 mm thick. Dynamic properties of rubber cylinders measuring about 9.5 mm in diameter and 16 mm high were analyzed by using a RDA (Rheometrics Dynamic Analyzer). Mooney viscosity measurements were conducted according to ASTM-D 1649-89.

Example 5

Synthesis of 2-Benzylthio-2-thiazoline

To a dry, nitrogen ($N_2$)-purged 500 milliliter (mL) round bottom flask was added 1.15 grams (g) (4.8 mmol) sodium hydride. To this was added 150 mL dry tetrahydrofuran and 5.70 g (4.8 mmol) 2-mercaptothiazoline in 24 mL tetrahydrofuran. After approximately 15 minutes of stirring at room temperature, 5.5 mL (4.8 mmol) benzyl chloride was added and stirred for an additional 5 minutes. Tetrahydrofuran was removed by rotary evaporation and product was dissolved in hexane. After filtration, the product was recrystallized from hexane to yield 2.6 g of white crystals (26% yield). $^1$H NMR ($CDCl_3$): 3.434 ppm, t, 2H; 4.259 ppm, t, 2H; 4.413 ppm, s, 2H; 7.317 ppm, m, 5H.

Example 6

Synthesis of 2-Dodecylthio-2-thiazoline

To a dry, $N_2$-purged 500 mL three-necked round bottom flask was added 1.30 g (4.7 mmol) of sodium hydride. To this was added 150 mL dried tetrahydrofuran and 5.70 g (4.8 mmol) of 2-mercaptothiazoline. After approximately 15 minutes of stirring at room temperature, 11.48 mL (4.8 mmol) of 1-bromododecane was added and stirred for 1 hour. The solution was rotary evaporated and the product dissolved in diethylether. The solution was extracted with three 50 mL aliquots of H$_2$O and dried over anhydrous MgSO$_4$. Product (3.16 g, 23% yield) was eluted from a neutral alumina column using pentane. $^1$H NMR (CDCl$_3$): 0.88 ppm, t, 3H; 1.28 ppm, m, 16H; 1.38 ppm, p, 2H; 1.67 ppm, p, 2H; 3.09 ppm, t, 2H; 3.38 ppm, t, 2H; 4.21 ppm, t, 2H.

Example 7

Synthesis of 2-Dimethylamino-2-thiazoline

To a dry, N$_2$-purged 500 mL three-necked flask equipped with reflux condenser and magnetic stirrer was added 100 mL dry THF under N$_2$. To this was added 41.1 mL of 2M (8.2 mmol) dimethylamine in THF. Then, 10 g (8.2 mmol) of 2-chloroethylisothiocyanate was added and a precipitate formed. To this was added 6.06 g (0.082 mmol) lithium carbonate and solution was refluxed for approximately 4 hours. After 48 hours, an additional 25 mL of 2.0 M (5.0 mmol) dimethylamine in THF was added and refluxed for 4 hours. Solvent was removed and product dissolved in 150 mL diethylether. This was extracted with three 50 mL aliquots of H$_2$O, dried with anhydrous MgSO$_4$, and rotary evaporated to yield 2.34 g (22% yield) of 2-dimethylamino-2-thiazoline. $^1$H NMR (CDCl$_3$): 2.98 ppm, s, 6H; 3.32 ppm, t, 2H; 4.01 ppm, t, 2H.

Example 8

Control Polymer

Example 8 was prepared as in Example 1.

Example 9

2-Benzylthio-2-thiazoline Functionalized Polymer

Example 9 was prepared as in Example 2, except that 1 equivalent of 2-benzylthio-2-thiazoline was added to the polymer cement instead of 2-methylthio-2-thiazoline.

Example 10

Control Polymer

Example 10 was prepared as in Example 1.

Example 11

2-Dodecylthio-2-thiazoline Functionalized Polymer

Example 11 was prepared as in Example 2, except that 1 equivalent of 2-dodecylthio-2-thiazoline was added to the polymer cement instead of 2-methylthio-2-thiazoline.

Example 12

Control Polymer

Example 12 was prepared as in Example 1.

Example 13

2-Dimethylamino-2-thiazoline Functionalized Polymer

Example 13 was prepared as in Example 2, except that 1 equivalent of 2-dimethylamino-2-thiazoline was added to the polymer cement instead of 2-methylthio-2-thiazoline.

The polymers of Examples 8-13 were characterized as set forth in Table IV.

TABLE IV

| | Example No. | | | | | |
|---|---|---|---|---|---|---|
| | 8 | 9 | 10 | 11 | 12 | 13 |
| Mn (kg/mol) | 115 | 121 | 93 | 126 | 141 | 151 |
| Mw (kg/mol) | 123 | 155 | 100 | 163 | 151 | 180 |
| Tg (° C.) | −30 | −31.2 | −35.4 | −35.2 | −31.7 | −31.6 |
| Styrene (%) | 21.2 | 21.3 | 21.4 | 21.1 | 20.4 | 20.4 |
| Block Styrene (%) | 2.4 | 2.5 | 2.4 | 2.3 | 2.5 | 2.5 |
| 1,2-butadiene (% of butadiene) | 57.6 | 58.1 | 54.0 | 52.4 | 58.1 | 58.1 |

Examples 14-19

Carbon Black Rubber Formulations

The rubber of Examples 8-13 was employed in tire formulations. The formulations, denoted Examples 14-19, are presented in Table V.

TABLE V

| | Example No. | | | | | |
|---|---|---|---|---|---|---|
| | 14 | 15 | 16 | 17 | 18 | 19 |
| | Initial Formulation | | | | | |
| Rubber Example No. | 8 | 9 | 10 | 11 | 12 | 13 |
| Rubber (weight parts) | 100 | 100 | 100 | 100 | 100 | 100 |
| Carbon Black | 55 | 55 | 55 | 55 | 55 | 55 |
| Wax | 1 | 1 | 1 | 1 | 1 | 1 |
| Antioxidant | 0.95 | 0.95 | 0.95 | 0.95 | 0.95 | 0.95 |
| Zinc Oxide | 2.5 | 2.5 | 2.5 | 2.5 | 2.5 | 2.5 |
| Stearic Acid | 2 | 2 | 2 | 2 | 2 | 2 |
| Aromatic Oil | 10 | 10 | 10 | 10 | 10 | 10 |
| Total | 171.45 | 171.45 | 171.45 | 171.45 | 171.45 | 171.45 |
| | Final Formulation | | | | | |
| Initial | 171.45 | 171.45 | 171.45 | 171.45 | 171.45 | 171.45 |
| Sulfur | 1.3 | 1.3 | 1.3 | 1.3 | 1.3 | 1.3 |
| Accelerators | 1.9 | 1.9 | 1.9 | 1.9 | 1.9 | 1.9 |
| Total | 174.65 | 174.65 | 174.65 | 174.65 | 174.65 | 174.65 |

Each carbon black rubber compound was prepared in two stages, as described above for Examples 3 and 4. Test specimens were prepared and subjected to various physical tests as for Examples 3 and 4. The results of these tests are reported in Table VI. Modulus at 300%, elongation at break, and tensile strength were measured according to ASTM D 412 (1998) Method B, where samples were died from a cured sheet about 1.8 mm thick. MH-ML and MDA t$_{50}$ were measured according to ASTM-D 2084 on a Moving Die Rheometer (MDR).

Bound rubber, a measure of the percentage of rubber bound, through some interaction, to the filler, was determined by solvent extraction with toluene at room temperature. More specifically, a test specimen of each uncured rubber formulation was placed in toluene for three days. The solvent was removed and the residue was dried and weighed. The percentage of bound rubber was then determined according to the formula % bound rubber=(100($W_d$−F))/R where $W_d$ is the weight of the dried residue, F is the weight of the filler and any other solvent insoluble matter in the original sample, and R is the weight of the rubber in the original sample.

TABLE VI

| | Example No. | | | | | |
|---|---|---|---|---|---|---|
| | 14 | 15 | 16 | 17 | 18 | 19 |
| ML1 + 4@130° C. | 27.4 | 42 | 26.6 | 41.1 | 36.2 | 46.4 |
| MH-ML @ 171° C. (Kg/cm) | 18.82 | 18.04 | 18.83 | 17.18 | 19.72 | 18.48 |
| MDR $t_{50}$ @ 171° C. (min) | 3.1 | 2.8 | 2.9 | 3.0 | 3.1 | 2.9 |
| 300% Modulus @ 23° C. (MPa) | 11.21 | 14.39 | 11.07 | 12.73 | 12.2 | 13.15 |
| Tensile @ Break @ 23° C. (MPa) | 17.77 | 16.88 | 16.84 | 19.59 | 16.02 | 15.5 |
| tan δ @ 2% E (0° C., 5 Hz) | 0.219 | .0277 | .0199 | .0253 | .0254 | .0271 |
| tan δ @ 2% E (50° C., 5 Hz) | 0.243 | 0.178 | 0.242 | 0.214 | 0.253 | 0.232 |
| tan δ @ 5% E (50° C., 1 Hz) | 0.245 | 0.144 | 0.249 | 0.147 | 0.225 | 0.163 |
| ΔG' (50° C.) (MPa)* | 4.571 | 1.17 | 5.156 | 1.212 | 4.196 | 1.798 |
| Bound Rubber (%) | 14.5 | 35.6 | 13.4 | 34.1 | 16.1 | 29.2 |

*ΔG' = G' (@0.25% E) − G' (@14.5% E)

Example 20

Control Polymer

To a 18.9 L reactor equipped with turbine agitator blades was added 4.93 kg hexane, 1.20 kg (34 wt %) styrene in hexane, and 7.40 kg (22.1 wt %) butadiene in hexane. To the reactor was charged 11.25 mL of 1.6 M butyllithium in hexane and 3.83 mL of 1.6 M 2,2'-di(tetrahydrofuryl)propane in hexane and the batch temperature was controlled at 49° C. After approximately 1 hour, the batch was cooled to 32° C. and a measured amount of live poly(styrene-co-butadiene) cement was then transferred to a sealed nitrogen purged 800 mL bottle. The bottle contents were then terminated with isopropanol, coagulated and drum dried.

Example 21

2-Benzothiazoleacetonitrile Functionalized Polymer

A second bottle of cement was transferred from the 18.9 L reactor used in Example 20 and to this was added 1 equivalent of 2-benzothiazoleacetonitrile per butyllithium. The bottle contents were then coagulated and drum dried. The polymers of Examples 20 and 21 were characterized as set forth in Table VII.

TABLE VII

| | Example No. | |
|---|---|---|
| | 20 | 21 |
| $M_n$ (kg/mol) | 119 | 117 |
| $M_w$ (kg/mol) | 127 | 123 |
| $T_g$ (° C.) | −33.1 | −33.1 |
| Styrene (%) | 20.5 | 20.5 |
| Block Styrene (%) | 2.0 | 2.0 |
| 1,2-butadiene (% of butadiene) | 56.1 | 56.1 |

The rubber of Examples 20 and 21 were employed in carbon black and carbon black/silica tire formulations. The formulations are presented in Table VIII. More specifically, the rubber of Example 20 was incorporated in the formulations of Examples 22 and 24. The rubber of Example 6 was incorporated in the formulations of Examples 23 and 25.

TABLE VIII

| | Example No. | | | |
|---|---|---|---|---|
| | 22 | 23 | 24 | 25 |
| Example 20 (weight parts) | 100 | 0 | 100 | 0 |
| Example 21 (weight parts) | 0 | 100 | 0 | 100 |
| Carbon Black | 55 | 55 | 35 | 35 |
| Silica | 0 | 0 | 30 | 30 |
| Wax | 1 | 1 | 0 | 0 |
| Antiozonant | 0.95 | 0.95 | 0.95 | 0.95 |
| Zinc Oxide | 2.5 | 2.5 | 0 | 0 |
| Stearic Acid | 2 | 2 | 1.5 | 1.5 |
| Aromatic Oil | 10 | 10 | 10 | 10 |
| Total | 171.45 | 171.45 | 177.45 | 177.45 |
| Remill | | | | |
| Initial | N/A | N/A | 177.45 | 177.45 |
| Silane Shielding Agent | N/A | N/A | 4.57 | 4.57 |
| Total | 171.45 | 171.45 | 182.02 | 182.02 |
| Final Formulation | | | | |
| Initial | 171.45 | 171.45 | 182.02 | 182.02 |
| Sulfur | 1.3 | 1.3 | 1.7 | 1.7 |
| Zinc Oxide | 0 | 0 | 2.5 | 2.5 |
| Accelerators | 1.9 | 1.9 | 2.25 | 2.25 |
| Total | 174.65 | 174.65 | 188.47 | 188.47 |

Examples 22 and 23

Carbon Black Rubber Formulations

Each carbon black rubber compound was prepared in two stages, as for Examples 3 and 4 above. Test specimens of each rubber formulation were prepared and subjected to various physical tests, as for Examples 3 and 4 above. The results of these tests are reported in Table IX. Modulus at 300% and tensile strength were measured according to ASTM D 412 (1998) Method B. Dynamic properties were determined by using a Rheometrics Dynamic Analyzer (RDA).

Examples 24 and 25

Carbon Black/Silica Rubber Formulations

Each carbon black/silica rubber compound was prepared in three stages named Initial, Remill and Final. In the initial part, the polymer from Examples 20 or 21 was mixed with carbon black, silica, an antioxidant, stearic acid, and aromatic oil in a 65 g Banbury mixer operating at 60 RPM and 133° C. Specifically, the polymer was first placed in the mixer, and after 0.5 minutes, the remaining ingredients except the stearic acid were added. The stearic acid was then added after 3 minutes. The initials were mixed for 5-6 minutes. At the end of the mixing the temperature was approximately 165° C. The sample was cooled to less that about 95° C. and transferred to a remill mixer.

In the remill stage, the initial formulation and a silane shielding agent were simultaneously added to a mixer operating at about 60 RPM. The shielding agent employed in these examples was EF(DiSS)-60, available from Rhein Chemie Corp. The starting temperature of the mixer was about 94° C.

The remill material was removed from the mixer after about 3 minutes, when the material temperature was between 135 and 150° C.

The finals were mixed by adding the remills, zinc oxide and the curative materials to the mixer simultaneously. The initial mixer temperature was 65° C. and it was operating at 60 RPM. The final material was removed from the mixer after 2.25 minutes when the material temperature was between 100 and 105° C. The test specimens were prepared and subjected to various physical tests as for Examples 3-4 above. The results of these tests are reported in Table IX.

TABLE IX

| | Example No. | | | |
|---|---|---|---|---|
| | 22 | 23 | 24 | 25 |
| ML$_{1+4}$ @ 130° C. | 24.0 | 32.9 | 57.4 | 72.8 |
| t$_5$ (min) | 22.9 | 21.8 | 38.1 | 30.3 |
| 200% Modulus @ 23° C. (MPa) | 6.56 | 6.66 | 6.45 | 6.88 |
| Tensile @ Break @ 23° C. (MPa) | 16.76 | 16.67 | 13.24 | 14.77 |
| Elongation Break 23° C. (%) | 419 | 393 | 417 | 396 |
| tan δ @ 0.5% E (0° C., 5 Hz) | 0.233 | 0.255 | 0.235 | 0.235 |
| ΔG' (50° C.) (MPa)** | 4.803 | 1.202 | 7.226 | 2.755 |
| tan δ @ 5% E (50° C., 1 Hz) | 0.260 | 0.155 | 0.242 | 0.180 |
| Shore A Peak (23° C.) | 73.1 | 69.4 | 78.3 | 75.9 |

**ΔG' = G' (@0.25% E) − G' (@14.5% E)

Example 26

Control Polymer

To a 18.9 L reactor equipped with turbine agitator blades was added 4.83 kg hexane, 1.20 kg (34 wt %) styrene in hexane, and 7.50 kg (22.1 wt %) butadiene in hexane. To the reactor was charged 11.25 mL of 1.6 M butyllithium in hexane and 3.83 mL of 1.6 M 2,2'-di(tetrahydrofuryl)propane in hexane and the batch temperature was controlled at 49° C. After approximately 1 hour, the batch was cooled to 32° C. and a measured amount of live poly(styrene-co-butadiene) cement was then transferred to a sealed nitrogen purged 800 mL bottle. The bottle contents were then terminated with isopropanol, coagulated and drum dried.

Example 27

2-Thiophenecarbonitrile Functionalized Polymer

A second bottle of cement was transferred from the 18.9 L reactor used in Example 26 and to this was added 1 equivalent of 2-thiophenecarbonitrile per butyllithium. The bottle contents were then coagulated and drum dried. The polymers of Examples 26 and 27 were characterized as set forth in Table X.

TABLE X

| | Example No. | |
|---|---|---|
| | 26 | 27 |
| M$_n$ (kg/mol) | 124 | 124 |
| M$_w$ (kg/mol) | 134 | 135 |
| T$_g$ (° C.) | −34.6 | −34.6 |
| Styrene (%) | 19.9 | 19.9 |
| Block Styrene (%) | 1.8 | 1.8 |
| 1,2-butadiene (% of butadiene) | 56.2 | 56.2 |

The rubber of Examples 26 and 27 were employed in carbon black and carbon black/silica tire formulations. The formulations are presented in Table XI. More specifically, the rubber of Example 26 was incorporated in the formulations of Examples 28 and 30. The rubber of Example 27 was incorporated in the formulations of Examples 29 and 31.

TABLE XI

| | Example No. | | | |
|---|---|---|---|---|
| | 28 | 29 | 30 | 31 |
| Example 26 (weight parts) | 100 | 0 | 100 | 0 |
| Example 27 (weight parts) | 0 | 100 | 0 | 100 |
| Carbon Black | 55 | 55 | 35 | 35 |
| Silica | 0 | 0 | 30 | 30 |
| Wax | 1 | 1 | 0 | 0 |
| Antiozonant | 0.95 | 0.95 | 0.95 | 0.95 |
| Zinc Oxide | 2.5 | 2.5 | 0 | 0 |
| Stearic Acid | 2 | 2 | 1.5 | 1.5 |
| Aromatic Oil | 10 | 10 | 10 | 10 |
| Total | 171.45 | 171.45 | 177.45 | 177.45 |
| Remill | | | | |
| Initial | N/A | N/A | 177.45 | 177.45 |
| Silane Shielding Agent | N/A | N/A | 4.57 | 4.57 |
| Total | 171.45 | 171.45 | 182.02 | 182.02 |
| Final Formulation | | | | |
| Initial | 171.45 | 171.45 | 182.02 | 182.02 |
| Sulfur | 1.3 | 1.3 | 1.7 | 1.7 |
| Zinc Oxide | 0 | 0 | 2.5 | 2.5 |
| Accelerators | 1.9 | 1.9 | 2.25 | 2.25 |
| Total | 174.65 | 174.65 | 188.47 | 188.47 |

Examples 28 and 29

Carbon Black Rubber Formulations

Each carbon black rubber compound was prepared in two stages, as for Examples 3 and 4 above. Test specimens of each rubber formulation were prepared and subjected to various physical tests, as for Examples 3 and 4 above. The results of these tests are reported in Table XII. Modulus at 300% and tensile strength were measured according to ASTM D 412 (1998) Method B. Dynamic properties were determined by using a Rheometrics Dynamic Analyzer (RDA).

Examples 30 and 31

Carbon Black/Silica Rubber Formulations

Each carbon black/silica rubber compound was prepared in three stages, as in Examples 24 and 25 above. The test specimens were prepared and subjected to various physical tests as for Examples 3-4 above. The results of these tests are reported in Table XII.

TABLE XII

| | Example No. | | | |
|---|---|---|---|---|
| | 28 | 29 | 30 | 31 |
| ML$_{1+4}$ @ 130° C. | 28.0 | 35.5 | 62.6 | 69.5 |
| t$_5$ (min) | 20.63 | 20.72 | 36.3 | 37.4 |
| 300% Modulus @ 23° C. (MPa) | 12.08 | 13.69 | 8.9 | 9.9 |
| Tensile @ Break @ 23° C. (MPa) | 17.88 | 18.27 | 13.4 | 14.5 |
| Elongation Break 23° C. (%) | 416 | 374 | 448 | 429 |
| tan δ @ 0.5% E (0° C., 5 Hz) | 0.232 | 0.266 | 0.211 | 0.214 |
| ΔG' (50° C.) (MPa)** | 4.200 | 1.169 | 7.43 | 4.70 |

TABLE XII-continued

| | Example No. | | | |
|---|---|---|---|---|
| | 28 | 29 | 30 | 31 |
| tan δ @ 5% E (50° C., 1 Hz) | 0.242 | 0.143 | 0.230 | 0.203 |
| Shore A Peak (23° C.) | 73.4 | 69.6 | 78.3 | 78.2 |

**ΔG' = G' (@0.25% E) − G' (@14.5% E)

Example 32

Synthesis of 2-(N-methyl-N-3-trimethoxysilylpropyl)-thiazoline

To a 500 mL round bottom flask was added 200 mL dry diethylether and 15.4 g (126 mmol) chloroethylisothiocyanate. To this was added 25 mL (126 mmol) of N-methylaminopropyltrimethoxysilane. Once bubbling had subsided 13.4 g of sodium carbonate was added and solution was refluxed overnight. Product was filtered and solvent was removed by rotary evaporation. 1H-NMR(CDCl$_3$): 3.95 ppm, t, 2H; 3.51 ppm, s, 9H; 3.20 ppm, t, 2H; 2.93 ppm, s, 3H; 1.62 ppm, m, 2H; 0.55 ppm, t, 2H. GC/MS showed 94.2% pure product.

Example 33

Control Polymer

Example 33 was prepared as in Example 20.

Example 34

2-(N-methyl-N-3-trimethoxysilylpropyl)thiazoline Functionalized Polymer

A second bottle of cement was transferred from the 18.9 L reactor used in Example 33 and to this was added 1 equivalent of 2-(N-methyl-N-3-trimethoxysilylpropyl)thiazoline per butyllithium. The bottle contents were then coagulated and drum dried. The polymers of Examples 33 and 34 were characterized as set forth in Table XIII.

TABLE XIII

| | Example No. | |
|---|---|---|
| | 33 | 34 |
| $M_n$ (kg/mol) | 114 | 172 |
| $M_w$ (kg/mol) | 119 | 205 |
| $T_g$ (° C.) | −35.0 | −35.0 |
| Styrene (%) | 20.2 | 20.2 |
| Block Styrene (%) | 2.0 | 2.0 |
| 1,2-butadiene (% of butadiene) | 54.4 | 54.4 |

Examples 35-38

Rubber Formulations

The rubber of Examples 33 and 34 were employed in carbon black and carbon black/silica tire formulations. The formulations are presented in Table XIV. More specifically, the rubber of Example 33 was incorporated in the formulations of Examples 35 and 37. The rubber of Example 34 was incorporated in the formulations of Examples 36 and 38.

TABLE XIV

| | Example No. | | | |
|---|---|---|---|---|
| | 35 | 36 | 37 | 38 |
| Example 33 (weight parts) | 100 | 0 | 100 | 0 |
| Example 34 (weight parts) | 0 | 100 | 0 | 100 |
| Carbon Black | 55 | 55 | 35 | 35 |
| Silica | 0 | 0 | 30 | 30 |
| Wax | 1 | 1 | 0 | 0 |
| Antiozonant | 0.95 | 0.95 | 0.95 | 0.95 |
| Zinc Oxide | 2.5 | 2.5 | 0 | 0 |
| Stearic Acid | 2 | 2 | 1.5 | 1.5 |
| Aromatic Oil | 10 | 10 | 10 | 10 |
| Total | 171.45 | 171.45 | 177.45 | 177.45 |
| Remill | | | | |
| Initial | N/A | N/A | 177.45 | 177.45 |
| Silane Shielding Agent | N/A | N/A | 4.57 | 4.57 |
| Total | 171.45 | 171.45 | 182.02 | 182.02 |
| Final Formulation | | | | |
| Initial | 171.45 | 171.45 | 182.02 | 182.02 |
| Sulfur | 1.3 | 1.3 | 1.7 | 1.7 |
| Zinc Oxide | 0 | 0 | 2.5 | 2.5 |
| Accelerators | 1.9 | 1.9 | 2.25 | 2.25 |
| Total | 174.65 | 174.65 | 188.47 | 188.47 |

Each carbon black rubber compound was prepared in two stages, as for Examples 3 and 4 above. Test specimens of each rubber formulation were prepared and subjected to various physical tests, as for Examples 3 and 4 above. The results of these tests are reported in Table IX. Modulus at 300% and tensile strength were measured according to ASTM D 412 (1998) Method B. Dynamic properties were determined by using a Rheometrics Dynamic Analyzer (RDA).

Each carbon black/silica rubber compound was prepared in three stages, as for Examples 24 and 25 above. The test specimens were prepared and subjected to various physical tests as for Examples 3-4 above. The results of these tests are reported in Table XV.

TABLE XV

| | Example No. | | | |
|---|---|---|---|---|
| | 35 | 36 | 37 | 38 |
| $ML_{1+4}$@130° C. | 27.9 | 37.8 | 55.2 | 106.1 |
| $t_5$ (min) | 21.5 | 21.6 | 41.1 | 19.7 |
| 200% Modulus @ 23° C. (MPa) | 6.08 | 7.22 | 6.33 | 7.87 |
| Tensile @ Break @23° C. (MPa) | 16.23 | 17.78 | 11.67 | 13.33 |
| Elongation Break 23° C. (%) | 442.9 | 390.7 | 379 | 301 |
| tan δ @ 0.5% E (0° C., 5 Hz) | 0.228 | 0.278 | 0.2069 | 0.2755 |
| ΔG' (50° C.) (MPa)** | 4.674 | 1.367 | 6.584 | 1.732 |
| tan δ @ 5% E (50° C., 1 Hz) | 0.268 | 0.169 | 0.2525 | 0.1623 |
| Shore A Peak (23° C.) | 69.3 | 71.3 | 80.5 | 73.3 |

**ΔG' = G' (@0.25% E) − G' (@14.5% E)

Various modifications and alterations that do not depart from the scope and spirit of this invention will become apparent to those skilled in the art. This invention is not to be duly limited to the illustrative embodiments set forth herein.

What is claimed is:

1. A method for preparing a functional polymer, the method comprising:
terminating a living polymer chain with a functionalizing agent where the functionalizing agent is defined by the formula

Z—R⁴-α where Z is a leaving group or an addition group, R⁴ is a bond or a divalent organic group, and α is a sulfur-containing heterocycle selected from the group consisting of thiirane, thietane, thiolane, thiazoline, dihydrothiophene, thiadiazine, thioxanthene, thianthrene, phenoxathiin, dihydroisothiazole, and thienofuran group or substituted form thereof.

2. The method of claim 1, where Z comprises a halide, a thio alkoxide group, an alkoxide group, a dialkyl amine group, a nitrile group, a Schiff base, a ketone group, an aldehyde group, or an ester group.

3. The method of claim 1, where the polymer chain is a rubbery polymer having a Tg that is less than 0° C.

4. The method of claim 1, where the polymer chain is polybutadiene, polyisoprene, poly(styrene-co-butadiene), poly(styrene-co-butadiene-co-isoprene), poly(isoprene-co-styrene), or poly(butadiene-co-isoprene).

5. The method of claim 1, where the functionalizing agent is defined by the formula

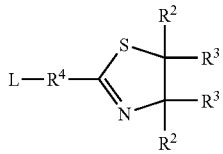

where L is a leaving group, R⁴ is a bond or a divalent organic group, each R² is independently hydrogen or a monovalent organic group, and each R³ is independently hydrogen or a monovalent organic group or where each R³ combine with each other to form a divalent organic group.

6. The method of claim 5, where the functionalizing agent is selected from the group consisting of 2-methylthio-2-thiazoline, 2-ethylthio-2-thiazoline, 2-propylthio-2-thiazoline, 2-butylthio-2-thiazoline, 2-pentylthio-2-thiazoline, 2-hexylthio-2-thiazoline, 2-heptylthio-2-thiazoline, 2-dodecylthio-2-thiazoline, 2-phenylthio-2-thiazoline, 2-benzylthio-2-thiazoline, 2-chloro-2-thiazoline, 2-bromo-2-thiazoline, 2-iodo-2-thiazoline, 2-dimethylamino-2-thiazoline, 2-diethylamino-2-thiazoline, 2-methoxy-2-thiazoline, 2-ethoxy-2-thiazoline, 2-(N-methyl-N-3-trimethoxysilylpropyl)-thiazoline, and 2-methylthio-1-aza-3-thia-bicyclo[3-4-0]-nonene.

7. The method of claim 1, where the functionalizing agent is defined by the formula

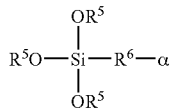

where α is a sulfur-containing heterocycle selected from the group consisting of thiirane, thietane, thiolane, thiazoline, dihydrothiophene, thiadiazine, thioxanthene, thianthrene, phenoxathiin, dihydroisothiazole, and thienofuran group or substituted form thereof each R⁵ is independently a monovalent organic group, and R⁶ is a bond or a divalent organic group.

8. The method of claim 1, where the functionalizing agent is defined by the formula

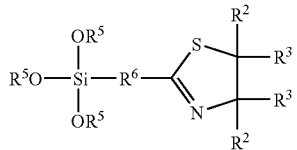

where each R² is independently hydrogen or a monovalent organic group, each R³ is independently hydrogen or a monovalent organic group or where each R³ combine with each other to form a divalent organic group, each R⁵ is independently a monovalent organic group, and R⁶ is a bond or a divalent organic group.

9. The method of claim 1, where the functionalizing agent is 2-(N-methyl-N-3-trimethoxysilylpropyl)thiazoline.

* * * * *